No. 792,594. PATENTED JUNE 20, 1905.
W. J. HISS, Jr.
COMBINED CABLE AND WIRE SUPPORTING CLIP.
APPLICATION FILED JAN. 27, 1905.
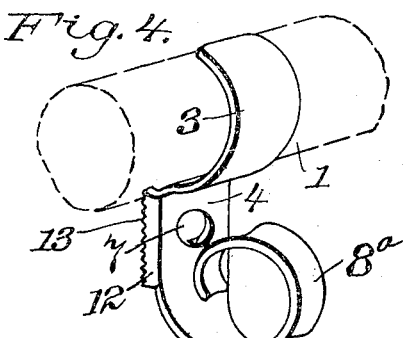
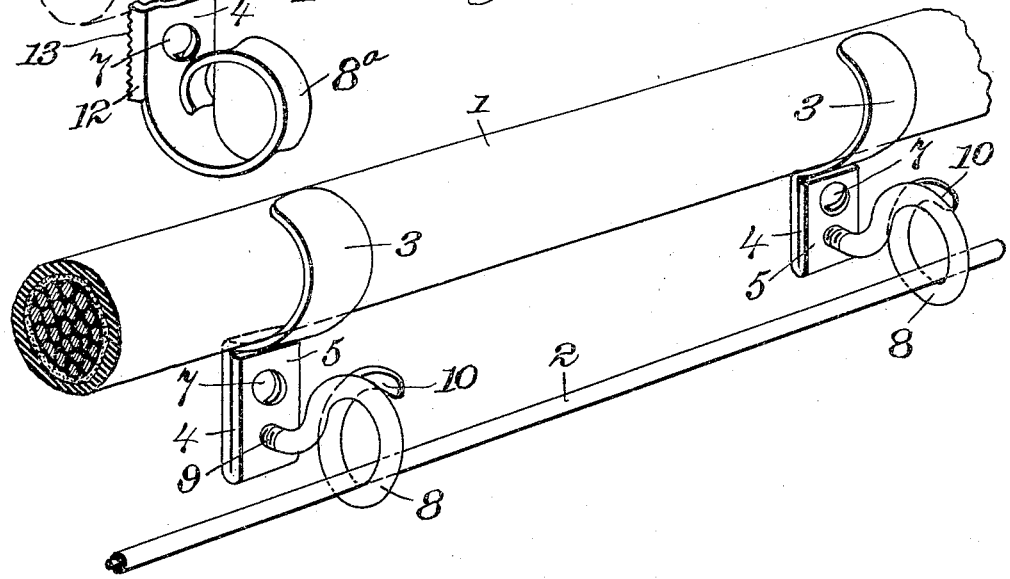
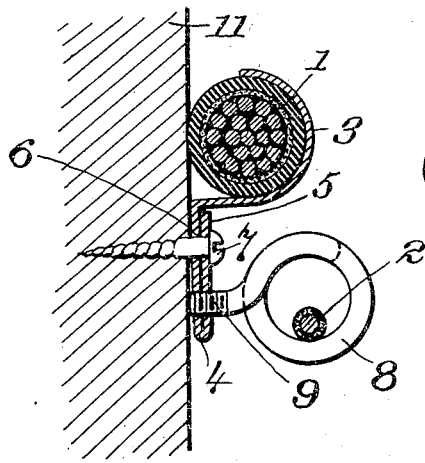
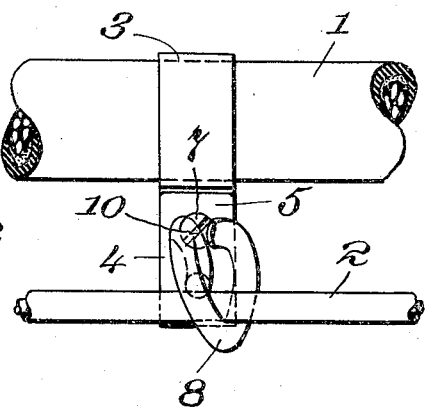
Witnesses
M. G. Crawford
W. H. Pumphrey
Inventor
William J. Hiss Jr.
By his Attorney No. 792,594. Patented June 20, 1905.

UNITED STATES PATENT OFFICE.

WILLIAM J. HISS, JR., OF NEW YORK, N. Y., ASSIGNOR TO DIAMOND EXPANSION BOLT COMPANY, A CORPORATION OF NEW YORK.

COMBINED CABLE AND WIRE SUPPORTING CLIP.

SPECIFICATION forming part of Letters Patent No. 792,594, dated June 20, 1905.

Application filed January 27, 1905. Serial No. 242,838.

*To all whom it may concern:*

Be it known that I, WILLIAM J. HISS, Jr., a citizen of the United States of America, and a resident of the borough of Manhattan, city, county, and State of New York, have invented certain new and useful Improvements in a Combined Cable and Wire Supporting Clip, of which the following is a specification.

My invention relates generally to means for supporting electric cables and wires where the same have to be run along the face of a wall or fence; and it more specifically consists of a combination cable-hook and wire clip designed to furnish secure support without injury to cable or wire and with the least possible destructive action on the wall or fence. Heretofore it has been customary to support such cables and the branch wires which are run from them by independent means. The cables are usually supported by drive-clamps which are spiked into the wall and the wires by a separate drive-ring, which is separately spiked into the wall. These attaching means have exerted a destructive action on both the cables and upon the walls to which they were applied. The insulating-coverings of the costly cables have usually been compressed and bent in attachment, and when the cables are taken down they are good for nothing except junk. The walls are liable to be split by the numerous spikes driven into them, and the hammering and drilling required is always objectionable to the tenants in the buildings to the walls of which the attachments are being made.

My invention supplies a combination hook or clip which will support both wires and cables without injuring the same and which can be attached to the wall or fence by one screw and still hold the cables firmly in place.

The preferred form of apparatus embodying my invention is illustrated in the accompanying sheet of drawings, in which—

Figure 1 is a perspective view showing two of my improved clips with section of cable and wire supported thereby. Fig. 2 is a cross-section through one of the clips and the cable and wire and a portion of the wall, and Fig. 3 is a detail side elevation of Fig. 2. Fig. 4 is a modification.

Throughout the drawings like reference-figures indicate like parts.

1 represents a length of lead-covered cable, 2 a similar length of insulated wire or smaller cable, and 3 is a cable-supporting hook made of a strip of steel or metal bent into proper form and provided with a projecting lug 4, which furnishes a bearing-face against the wall or fence 11. Preferably the hook and lug are made of one strip of metal of even width and thickness, the portion forming the lug being doubled back upon itself to form a second thickness 5 to strengthen the lug and furnish a better holding-ground for the wall-screw 7, which goes through the hole 6, and for the screw-threaded portion 9 of the screw-eye 8. Preferably the screw-eye 8 is provided with a diagonal slit or opening 10 to permit the insertion of the wire 2 in a direction radial of the eye. In the construction shown this diagonal opening is produced by bending the wire rod forming the screw-eye up in a spiral form.

In the modification shown in Fig. 4 the hook 3 and eye 8ª are made out of a single strip of material.

The portion 4 may be strengthened by bending up the edges, as at 12 12, and the same may have teeth 13 to give a better grip upon the wall or fence.

The mode of operation of my invention is as follows: The cable 1 being temporarily held in proper position, the hooks 3 3 are placed under and outside of it and the screws 7 7 forced into the wall or fence 11 to support the same. This holding-screw, as shown, is preferably passed through that portion of the lug adjacent to the hook 3, as the hook is thereby more firmly clamped down upon the cable. The screw-eye 8 is then screwed into the threaded opening located in the other end of the lug until the end of the threaded portion 9 of the screw-eye abuts up against the wall 11. The screw-eye is then set up hard in its position, thereby tending to spring the lower end of the lug away from the wall, as shown in Fig. 2. This serves the double purpose of causing the hook to still more firmly clamp the cable and to put all the parts under spring tension. The wire or wires 2 are then slipped into the interior of the screw-eye 8 by being looped through the diagonal opening 10. Of course any form of wooden or expanding metal plug can be used to give the screw a better hold upon a wall of masonry.

The advantages of my invention comprise its compact form, the security of its fastening means, its readiness of application and removal to and from the wall, and the reduction of the number of perforations required in the wall, as well as the saving in labor and material resulting from its use and the protection of the cable from damage.

It is evident that various changes could be made in the details of construction shown without departing from the spirit and scope of my invention. The proportions of the various parts might be varied, other forms of screw-eyes employed, another method of forming the attaching-lug substituted, and so on. Such variations of detail I should, however, consider modifications of my invention.

Having therefore described my invention, what I claim as new, and desire to protect by Letters Patent, is—

1. In a cable and wire wall-clip the combination of a cable-supporting hook provided with a lug furnishing a bearing-face against the wall, means for attaching said lug to the wall, and a wire-supporting screw-eye screwed into said lug.

2. In a cable and wire wall-clip the combination of a cable-supporting hook provided with a lug furnishing a bearing-face against the wall, means for attaching said lug to the wall located near that end of the lug adjacent to the hook, and a wire-supporting screw-eye screwed into the other end of the lug and abutting against the wall.

3. In a cable and wire wall-clip the combination of a cable-supporting hook provided with a lug furnishing a bearing-face against the wall, means for attaching said lug to the wall, and a wire-supporting screw-eye screwed into said lug, the eye of said screw-eye having a diagonal opening to admit the wire radially of the eye.

4. In a cable and wire wall-clip the combination of a cable-supporting hook provided with a lug furnishing a bearing-face against the wall, means for attaching said lug to the wall, and a wire-supporting screw-eye screwed into said lug, the hook and lug being made of one strip of metal doubled back to form the lug.

5. In a cable and wire wall-clip, the combination of a cable-supporting hook provided with a lug furnishing a bearing-face against the wall, said lug being provided with an aperture for attachment to a wall and being provided with a wire-supporting eye having a wire-inserting opening therein.

6. In a wall-clip, the combination of a supporting-hook provided with a lug to engage the wall, said lug having an aperture for attaching the same to the wall and having a threaded hole for the insertion of a screw to engage the wall and exert a tension action in connection with the attaching means.

Signed at New York city, New York, this 23d day of January, 1905.

WILLIAM J. HISS, Jr.

Witnesses:
   J. E. PEARSON,
   A. PARKER-SMITH.